United States Patent [19]
Tanzosh

[11] Patent Number: 5,582,212
[45] Date of Patent: Dec. 10, 1996

[54] CONTINUOUSLY SLITTED ROLL-ON TUBE SHIELD

[75] Inventor: James M. Tanzosh, Silver Lake, Ohio

[73] Assignee: The Babcock & Wilcox Company, New Orleans, La.

[21] Appl. No.: 336,350

[22] Filed: Nov. 8, 1994

[51] Int. Cl.$^6$ .................................................. F16L 11/00
[52] U.S. Cl. ........................ 138/110; 138/129; 138/134
[58] Field of Search ................................. 138/110, 129, 138/122, 133–136

[56] References Cited

U.S. PATENT DOCUMENTS

| | | | |
|---|---|---|---|
| 92,381 | 7/1869 | Smith | 138/129 |
| 1,977,775 | 10/1934 | Patterson | 138/110 |
| 2,032,753 | 3/1936 | James | 138/129 X |
| 2,045,568 | 6/1936 | Burd | 138/134 X |
| 2,160,240 | 5/1939 | Wallace et al. | 138/129 X |
| 2,166,448 | 7/1939 | Schuknecht et al. | 138/110 X |
| 2,441,321 | 5/1948 | Ingalls | 138/110 X |
| 3,117,371 | 1/1964 | Farley | 138/110 X |
| 3,237,796 | 3/1966 | Callahan | 138/110 X |
| 3,468,733 | 9/1969 | Dunlap, Jr. et al. | 138/129 X |
| 3,616,819 | 11/1971 | Dunlap, Jr. et al. | 138/129 X |

*Primary Examiner*—Patrick Brinson
*Attorney, Agent, or Firm*—Robert J. Edwards; Michael L. Hoelter

[57] ABSTRACT

A shield that is normally positioned or wrapped around a boiler tube when such tube is exposed to extreme operating conditions. This shield consists of an elongated strip of thin material that is formed as a helix. This strip also incorporates a means for spacing this strip from the tube so as to create a gap between the tube and the shield. Generally the shield is secured to the tube by spot or button welding only the longitudinal end regions of the strip to the tube. By thus wrapping and securing one or more such shields to the tube, the tube is protected while still permitting both it and the shield(s) to expand and contract as needed.

20 Claims, 1 Drawing Sheet

CONTINUOUSLY SLITTED ROLL-ON TUBE SHIELD

FIELD OF THE INVENTION

This invention pertains to tube shields normally found in steam boilers and the like and more particularly to a spirally cut tube shield that completely surrounds the heat tube.

BACKGROUND OF THE INVENTION

It is common to use tube shields in steam boilers and the like to protect the boiler tubing from the environmental conditions existing within the steam boiler. Such shields guard or shelter the boiler tube surface from the effects of excessive corrosion or erosion thereby extending the life of these boiler tubes.

Generally, tube shields are made of a high alloy steel such as austenitic stainless steel. However, non-metallic materials, such as ceramics, have and can be used for tube shielding. Such material is usually more resistant to attack than the alloy used in the construction of the boiler tubes. Alternatively, sometimes tube shields of an alloy similar to that of the boiler tube is used with the intent being to supply sacrificial material that will corrode or erode in preference to the boiler tube itself.

In any event, these tube shields are typically continuous devices shaped approximately like a tube that has been split longitudinally to form in cross-section an arc of about 180° to about 2250°. Such tube shields are placed over the boiler tube and are held in place via a plurality of welded straps that extend around to the back side of the boiler tube. (For the purposes herein, the front side of the boiler tube is the side facing the onrushing furnace gas.) Alternatively, the shields may be applied by simply snapping them over the boiler tube and allowing the natural elasticity of the shield metal to hold them in place.

Sometimes, when the boiler fuel is coal, these tube shields are made to run at metal temperatures higher than the boiler tube they protect. Such running or melting is controlled by the size of the gap or spacing between the boiler tube and the tube shield. For other fuels, such as fuel oil or refuse, the general objective is to keep the shield as cool as possible, such as by minimizing the gap between the cooler boiler tube and the shield.

Unfortunately, these existing shields have ongoing problems with the straps used to secure them to the boiler tube. Such straps oftentimes break, or the welds come loose, due to the extreme conditions existing within the boiler enclosure. Also, due to the continuous nature of these tube shields, they frequently become distorted or buckle while in service. When this occurs, the damaged boiler tube then imposes a significantly higher load or stress upon adjacent straps that can, in turn, cause these adjacent straps to weaken and break. Additionally, such buckled or distorted tube shields lose their convex or arc shape and act to block boiler flue gas flow around and between the array of shielded boiler tubes. This has the potential of compromising boiler thermal performance, and causing flue gas velocity increases (due to constriction flow area) which can further aggravate corrosion or erosion problems. Consequently, when such injury to the tube shield occurs, it is no longer capable of protecting the boiler tube thereby exposing the boiler tube to the full force and effect of the gas flow stream.

Snap-on shields suffer similar problems, either by losing elastic capture due to thermal softening and/or dislodging due to distortions and buckling.

In many cases, damage to the tube shield and/or its mounting hardware occurs due to temperature variances, usually unavoidable, along the length and around the arc of the shield. In other cases, damage can arise due to the mechanical loads incurred from the use and operation of sootblowers. In still other cases, such damage is the result of a difference in the expansion rates between the tube and the shield when such items are heated. In any event, such extreme operating conditions cannot generally be controlled and thus the need for a tube shield that is capable of withstanding these conditions without incurring any damage.

It is thus an object of this invention to provide a tube shield that surrounds and protects the entire boiler tube rather than just a portion of the boiler tube. Another object of this invention is to provide an assured positive shield capture against the tube. It is another object of this invention to provide a tube shield that does not rely upon straps for attachment to the boiler tube. Still another object of this invention is to provide a tube shield that can easily compensate for or accommodate differences in thermal expansion between the tube shield and the boiler tube without buckling or otherwise being damaged. Yet another object of this invention is to provide a unique manner of securing the tube shield to the boiler tube which minimizes the welding required thereby minimizing the welding required during construction and reducing the risk that such welds will be compromised during operation. These and other objects and advantages of this invention will become obvious upon further investigation.

SUMMARY OF THE INVENTION

What is disclosed is a shield that protects an object, usually a tube, from extreme environmental conditions. This shield consists of an elongated strip having top and bottom sides and first and second longitudinal end regions. The shield also forms a helix along its length. A gap forming assembly can be incorporated along this strip so as to form a gap between the strip and the object to be protected when advantageous. This shield is generally secured to the object by welding the first and second longitudinal end regions of the strip to the object after the strip has been wrapped around this object.

BRIEF DESCRIPTION OF THE INVENTION

DETAILED DESCRIPTION OF THE INVENTION

Figure 1:
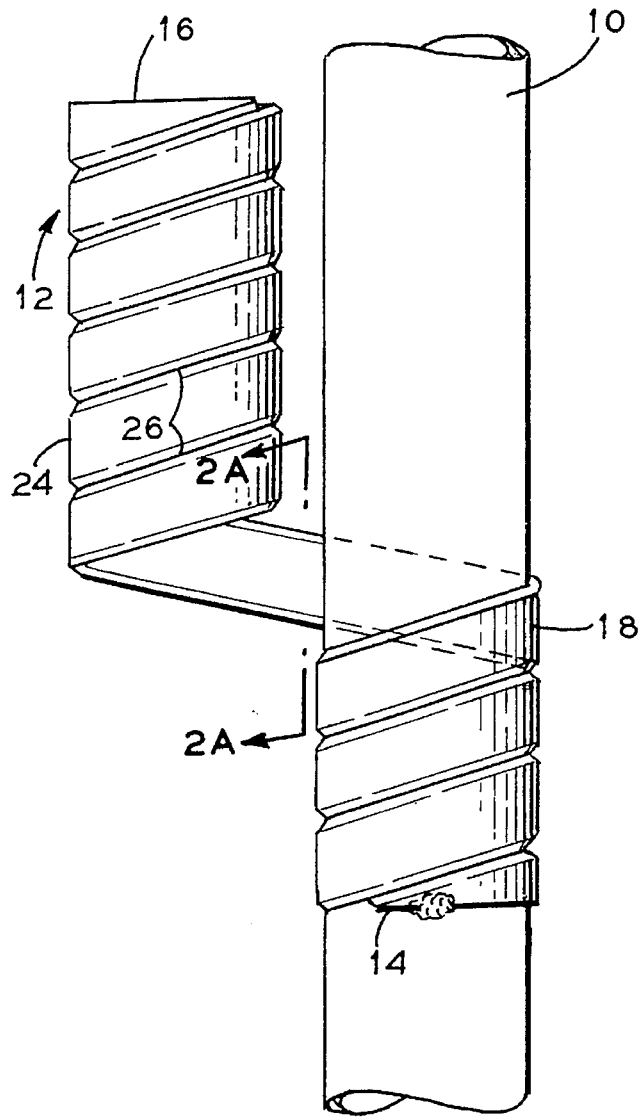
FIG. 1 is a pictorial view of the invention illustrating the installation of the tube shield around the boiler tube.

Referring initially to FIG. 1, there is shown boiler tube 10 being wrapped by tube shield 12 as contemplated by this invention. Tube shield 12 is sequentially unrolled and/or wrapped around boiler tube 10 from its starting point 14 to its ending point 16. Both starting point 14 and ending point 16 would generally be secured or affixed to tube 12 via a spot or button weld or the like. However, attachment need only be made at one end (i.e. the lower end) for vertical tubes since gravity will hold the helix in place. No other manner of rigidly affixing or bracing tube shield 12 with respect to tube 10 is needed intermediate these points 14 and 16.

Figure 2A:
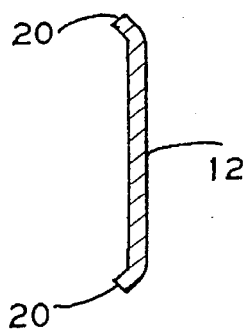
FIG. 2A is a sectional view taken along lines 2A—2A of FIG. 1 illustrating how the gap or spacing between the tube shield and the boiler tube is accomplished.

As shown in FIG. 2A (and an alternate version illustrated in FIG. 2B), tube shield 12 is not flat but instead has a non-planar cross-section so as to space shield 12 a small distance or gap 18 from tube 10. Such a non-planer cross-section may be continuous and/or uniform along the length of tube shield 12 or such a cross-section may be intermittent, non-continuous, or spaced along such length. In other words, gap 18 may be caused by a continuous bend or a continuous depression of shield 12 or gap 18 may be caused by a series of spaced bends or depressions along shield 12.

Figure 2B:
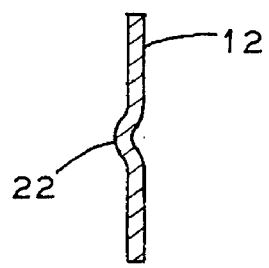
FIG. 2B is an alternate embodiment of the sectional view taken along lines 2A—2A of FIG. 1 illustrating how the gap or spacing between the tube shield and the boiler tube is accomplished.

FIGS. 2A and 2B illustrate one of many different variations of the cross-section of tube shield 12 that are possible so as to create gap 18 between tube 10 and shield 12. FIG. 2A illustrates one embodiment of shield 12 having bent top and bottom sides 20 while FIG. 2B illustrates another embodiment of shield 12 having a depressed, notched or dimpled mid-portion 22 intermediate its top and bottom sides. Again, it should be noted that the cross-section illustrated in FIGS. 2A and 2B (or other such configurations) may either be continuous or intermittent along the length of shield 12.

Tube shield 12 is generally constructed of a long thin strip 24 of high alloy steel, such as austenitic stainless steel, which is generally more resistant to attack than the material normally comprising tube 10. It is generally coiled about a central longitudinal axis and is preferably constructed of a thin walled material. Shield 12 can either be spiral cut from a tube or other cylinder of such material or shield 12 can be made of a narrow strip that is subsequently forced into a helix. Usually, for uniformity, top an bottom sides of strip 24 will extend generally parallel to each other regardless of the configuration chosen for strip 24 (i.e. regardless of its cross-section).

Once shield 12 has been dimpled or bent as indicated either in FIG. 2A, 2B, or otherwise, tube shield 12 is then wrapped or applied over and completely around tube 10 so as to protect it. As stated earlier, final attachment to tube 10 is made with a single spot or button weld at the ends 14 and 16 of this shield 12. Alternatively, and especially for vertical tubes 10, tube shield 12 need only be secured at one end (generally the lower end) to tube 10 since gravity will hold the remainder of the helix in place.

In this fashion, all of shield 12 is positively captured along and fully around the entire protected length of tube 10 without the need for any intermediate means of attachment to tube 10. In other words, tube shield 12 continuously protects all of tube 10 without welding or other means of fixation other than the one or two welds necessary at the extreme ends of shield 12. Such a manner of securement is possible due to the spiral cut nature of tube shield 12. Also, this spiral cut provides freedom from differential movement between tube 10 and shield 12 whether such movement be along the axis or along the circumference of tube 10 and/or shield 12. Thus, tube 10 and shield 12 may each expand and contract differently without affecting the protection provided tube 10 via shield 12.

Alternatively, to permit totally free and independent differential expansion between shield 12 and tube 10, one end of shield 12 can remain unwelded (i.e. shield 12 is secured to tube 10 at one end only permitting the opposite end to move as needed). Additionally, such free and independent expansion can be accomplished by incorporating a small gap between one or more of the spiral wraps so as to accommodate different axial growth from that of tube 10.

Figure 3:
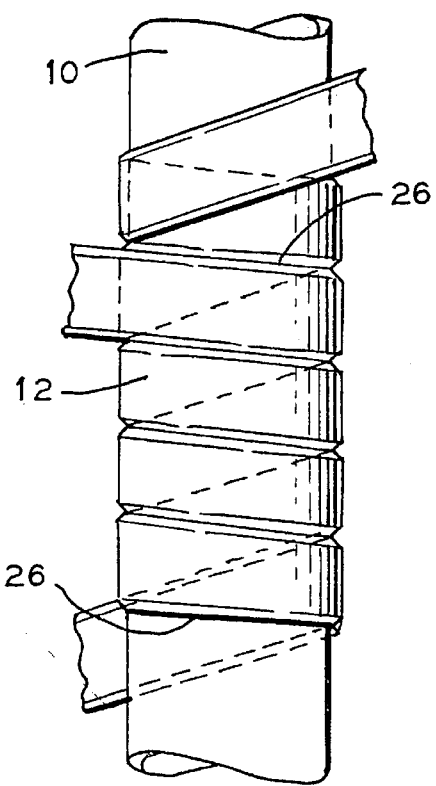
FIG. 3 is a pictorial view, partially cut away, illustrating how successive layers of the tube shield can be installed for increased protection of the boiler tube.

Referring to FIG. 3, there is shown one manner of unrolling or applying multiple tube shields 12 around tube 10. As can be seen, each successive layer of tube shield 12 would be laid having an opposite pitch so that the seams 26 of an inner layer would be covered by strip 24 of an outer layer. Should more that two layers of shield 12 be desired, the variation of the pitch of each successive layer would alternate as indicated. Such multiple layering of shield 12 provides more protection for tube 10 by incorporating successive thicknesses of resistant material as well as gaps between such layers. As many multiple layers can be added as necessary until the desired level of protection is achieved. This may be dependent upon a single or successive gaps between each layer or upon the thickness of the material that will actually be surrounding tube 10, or a combination of the two. Also, different materials may be used for each successive layer of shield 12 depending on the property and the level of protection desired at that layer. The material used at the different layers of shield 12 will usually be dependent upon the temperature each such layer must withstand. As can be imagined, the outermost layers would be subject to higher temperatures than would lower or inner layers and thus the outermost layers could be manufactured of a material having a different temperature characteristics than that of the lower or inner layers.

Of course, depending upon the selected layer, the depth of the bend or dimples imposed upon shield 12 as shown in FIG. 2 can also vary. This would make it possible for there to be a greater gap between outermost layers than is provided for innermost layers of shield 12. Alternatively, all the bend or dimples imposed upon the thin strips of shield 12 can be consistent regardless of the layer.

In the event multiple layers of shield 12 are desired but they are to be unrolled in the same direction (i.e. having the same pitch), then the first and subsequently odd number of layers can be installed having the configuration of FIG. 2A while the second and subsequently even number of layers can be installed having the configuration of FIG. 2B (or vice versa). In this fashion, for all but the first layer, depression or indentation 22 would nestle between the adjacent bent sides 20 of its respective underneath layer while the adjacent bent sides 20 would nestle within depression or indentation 22 of its respective underneath layer. This would serve the purpose of effectively locking each successive layer of shield 12 in place while still covering seams 26. However, it should be noted that such locking is not the same as permanently affixing shield 12 in place since such locking would still permit shield 12 (and also tube 10) to expand and contract as needed while still providing protection to tube 10.

As can be imagined, the application of tube shield 12 around tube 10 during construction is relatively quick and easy since the only welding required are at ends 14 and 16, there being no intermediate straps or braces required. Also, the length of tube shield 12 can be easily adjusted or varied by merely cutting tube shield 12 where desired. Thus, the portion of tube 10 exposed to the most physically demanding environment may be equipped with more layers of tube shield 12 than adjacent portions of tube 10 that are not so exposed.

Furthermore, should it be found that additional layers of protection are required, or should it be found that too much protection has been applied, adjustments in the number of layers of tube shield 12 around tube 10 may easily be made. This is accomplished by simply adding more layers or removing existing layers from around tube 10.

Finally, while the above description is with respect to a circular tube 10, shield 12 can also accommodate and protect non-circular tubes as well. Also, the item being protected need not necessarily be a tube since shield 12 can also be wrapped around any support structure or other member that requires protection from extreme environmental conditions.

What is claimed is:

1. A shield for protecting a generally cylindrical object comprising:

(a) an elongated strip having top and bottom sides, first and second longitudinal end regions and forming a helix along its length;

(b) gap forming means for forming a gap between said strip and the object to be protected;

(c) means for fixedly securing said first end region of said strip to the object; and, (d) means for subsequently securing said second end region of said strip to the object after said strip has been wrapped around this object, wherein said means for securing said first end region comprises welding.

2. The shield as set forth in claim 1 wherein said strip has a non-planer cross-section.

3. The shield as set forth in claim 2 wherein said top and bottom sides extend generally parallel to each other along the length of said strip.

4. The shield as set forth in claim 3 wherein said gap forming means are continuous along the length of said strip.

5. The shield as set forth in claim 4 wherein said top and bottom sides form said gap forming means.

6. The shield as set forth in claim 4 wherein a mid-region of said strip intermediate said top and bottom sides comprise a depression forming said gap forming means.

7. The shield as set forth in claim 4 further comprising locking means for flexibly securing at least one said strip in place along its length when multiple layers of said strips are installed.

8. The shield as set forth in claim 3 wherein said gap forming means are not continuous along the length of said strip.

9. The shield as set forth in claim 8 wherein said top and bottom sides form said gap forming means.

10. The shield as set forth in claim 8 wherein a mid-region of said strip intermediate said top and bottom sides comprise a depression forming said gap forming means.

11. A method of shielding a generally cylindrical object comprising the steps of:

(a) constructing and arranging an elongated strip having top and bottom sides and first and second longitudinal end regions, said strip forming a helix along its length;

(b) forming said strip with gap forming means for creating a gap between said strip and the object to be protected;

(c) fixedly securing said first end region of said strip to the object; and, (d) securing said second end region of said strip to the object after said strip has been wrapped around this object, wherein said step of securing the first end region to the tube comprises welding.

12. The method as set forth in claim 11 further comprising the step of constructing and arranging said strip with a non-planer cross-section.

13. The method as set forth in claim 12 further comprising the step of extending said top and bottom sides generally parallel to each other along the length of said strip.

14. The method as set forth in claim 13 further comprising the step of continuously forming said gap forming means along the length of said strip.

15. The method as set forth in claim 14 further comprising the step of forming said gap forming means via said top and bottom sides of said strip.

16. The method as set forth in claim 14 further comprising the step of forming said gap forming means via a depression in a mid-region of said strip intermediate said top and bottom sides.

17. The method as set forth in claim 14 further comprising the step of flexibly securing at least one said strip in place along its length when multiple layers of said strips are installed.

18. The method as set forth in claim 13 further comprising the step of intermittently forming said gap forming means along the length of said strip.

19. The method as set forth in claim 18 further comprising the step of forming said gap forming means via said top and bottom sides of said strip.

20. The method as set forth in claim 18 further comprising the step of forming said gap forming means via a depression in a mid-region of said strip intermediate said top and bottom sides.

* * * * *